US010441833B2

United States Patent
Pohl et al.

(10) Patent No.: US 10,441,833 B2
(45) Date of Patent: Oct. 15, 2019

(54) ALARM VALVE STATION OF A FIRE EXTINGUISHING SYSTEM, IN PARTICULAR A SPRINKLER OR SPRAY WATER EXTINGUISHING SYSTEM, AND FIRE EXTINGUISHING SYSTEM

(71) Applicant: Minimax GmbH & Co. KG, Bad Oldesloe (DE)

(72) Inventors: Matthias Pohl, Stubben (DE); Frank Stachowitz, Ratzeburg (DE); Peter Kempf, Bad Oldesloe (DE); Georg Kunert, Wismar (DE)

(73) Assignee: MINIMAX GMBH & CO. KG, Bad Oldesloe (DE)

( * ) Notice: Subject to any disclaimer, the term of this patent is extended or adjusted under 35 U.S.C. 154(b) by 0 days.

(21) Appl. No.: 15/537,325

(22) PCT Filed: Dec. 18, 2015

(86) PCT No.: PCT/EP2015/080592
§ 371 (c)(1),
(2) Date: Jun. 16, 2017

(87) PCT Pub. No.: WO2016/097341
PCT Pub. Date: Jun. 23, 2016

(65) Prior Publication Data
US 2017/0326396 A1    Nov. 16, 2017

(30) Foreign Application Priority Data
Dec. 19, 2014   (DE) .................. 10 2014 226 639

(51) Int. Cl.
A62C 35/68    (2006.01)
A62C 37/44    (2006.01)
(Continued)

(52) U.S. Cl.
CPC .............. *A62C 37/50* (2013.01); *A62C 35/68* (2013.01); *A62C 37/44* (2013.01); *F16K 37/005* (2013.01); *F16K 37/0041* (2013.01)

(58) Field of Classification Search
CPC ......... A62C 35/68; A62C 37/44; A62C 37/50; F16K 37/0041; F16K 37/005
See application file for complete search history.

(56) References Cited

U.S. PATENT DOCUMENTS 7,633,393 B2 * 12/2009 Bonne ...................... G08B 5/36
                                                            340/539.22
9,072,924 B2 *  7/2015 Capsius ................. A62C 35/62
(Continued)

FOREIGN PATENT DOCUMENTS

CN       203431188 U    2/2014
DE       19904477 A1    8/2000
(Continued)

OTHER PUBLICATIONS

Korean Patent Office, Korean Office Action and English translation issued in Korean Patent Application No. 10-2017-7020018, dated Sep. 17, 2018, 22 pages.
(Continued)

*Primary Examiner* — William M McCalister
(74) *Attorney, Agent, or Firm* — Perkins Coie LLP

(57) ABSTRACT

An alarm valve station (80) of a fire extinguishing system (100) includes a fire extinguishing system valve (1) having a housing (2, 3) which has a fluid inlet chamber (8), a fluid outlet chamber (9) and a closing body (4a) reciprocable between a blocking state and a release state, wherein the fluid inlet chamber (8) and the fluid outlet chamber (9) are separated from each other in the blocking state and communicate with each other in fluid-conducting relationship in the release state. In particular it is proposed that the evaluation unit is connected in signal-conducting relationship to
(Continued)

Figure 1:
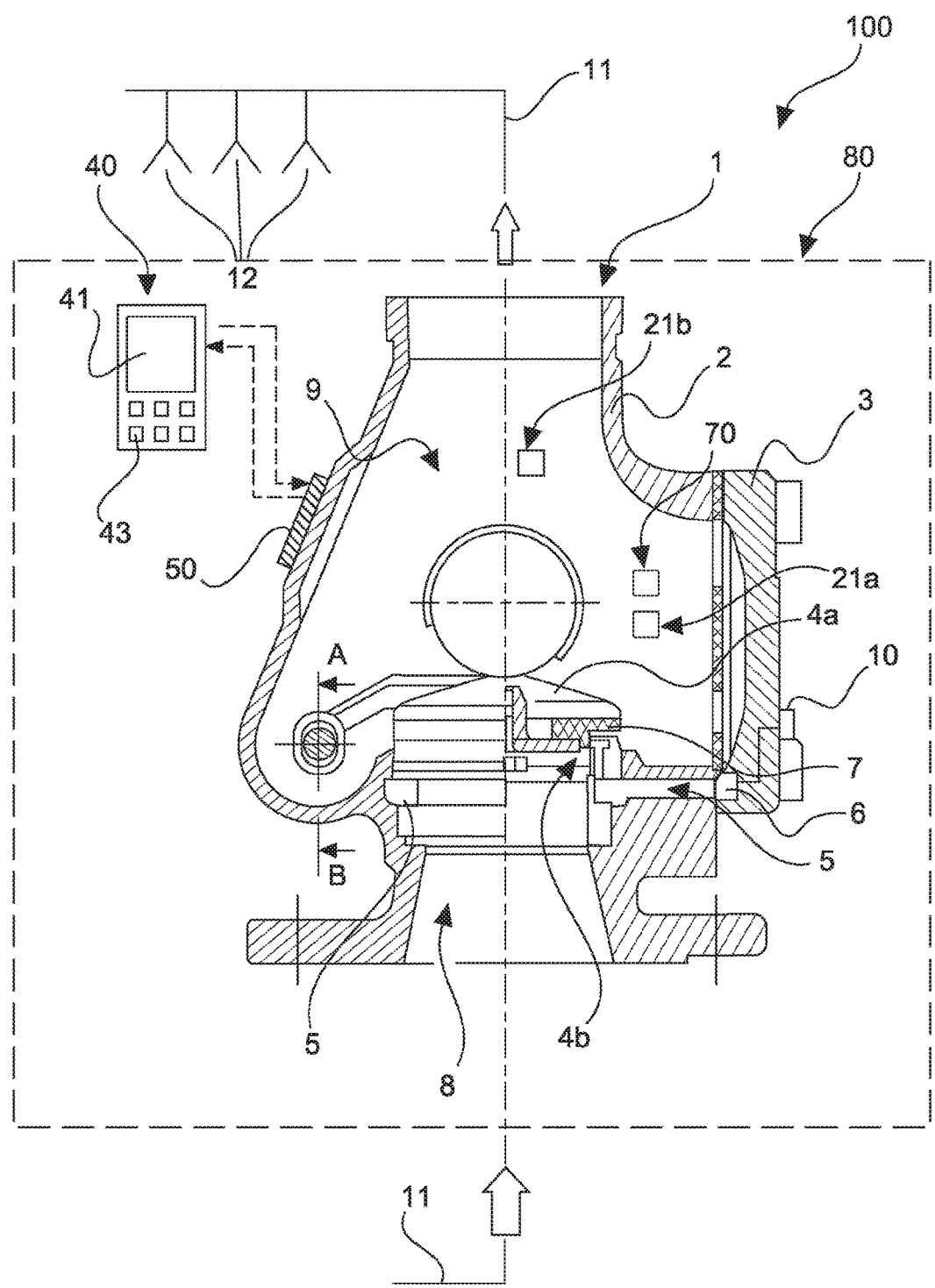

one or more actuators, and is adapted to control the actuator or actuators by the control commands, wherein the alarm valve station preferably has one or more sensors and the evaluation unit is connected in signal-conducting relationship to the sensor or sensors and is adapted to control the actuator or actuators in dependence on the sensor data present thereat.

22 Claims, 6 Drawing Sheets

(51) Int. Cl.
*A62C 37/50* (2006.01)
*F16K 37/00* (2006.01)
*F16K 1/20* (2006.01)
*F16K 27/02* (2006.01)

(56) References Cited

U.S. PATENT DOCUMENTS

| | | | |
|---|---|---|---|
| 9,526,933 B2* | 12/2016 | Kochelek | A62C 35/62 |
| 9,677,691 B2* | 6/2017 | Multer | F16L 3/00 |
| 9,974,991 B2* | 5/2018 | Ernfjall | A62C 35/68 |
| 2002/0029808 A1 | 3/2002 | Friend et al. | |
| 2007/0068225 A1 | 3/2007 | Brown | |
| 2008/0277125 A1* | 11/2008 | Wilkins | A62C 35/645 169/46 |
| 2011/0056709 A1 | 3/2011 | Feenstra | |
| 2014/0014187 A1 | 1/2014 | Hunt et al. | |
| 2014/0048290 A1* | 2/2014 | Bodemann | A62C 35/60 169/16 |
| 2017/0348557 A1 | 11/2017 | Pohl et al. | |

FOREIGN PATENT DOCUMENTS

| | | |
|---|---|---|
| DE | 102007049588 A1 | 4/2009 |
| EP | 268763 A1 | 1/2014 |
| JP | H03-178673 A | 8/1991 |
| JP | H-07204290 | 8/1995 |
| JP | H-10179790 | 7/1998 |
| JP | 2001-112882 A | 4/2001 |
| JP | 3292567 B2 | 6/2002 |
| JP | 2003-010356 A | 1/2003 |
| JP | 2003062111 | 3/2003 |
| JP | 2004-160027 A | 6/2004 |
| JP | 2004160027 | 6/2004 |
| JP | 2005-040451 A | 2/2005 |
| JP | 2005058460 | 3/2005 |
| JP | 3685883 B2 | 8/2005 |
| JP | 2012-055505 A | 3/2012 |
| JP | 2013-085914 A | 5/2013 |
| JP | 07116284 A | 5/2015 |
| KR | 2004629910000 | 10/2012 |
| WO | 1990/15948 A1 | 12/1990 |
| WO | 2010063266 A1 | 6/2010 |
| WO | WO2012/124349 A1 | 3/2012 |

OTHER PUBLICATIONS

Japanese Office Action dated Jul. 31, 2018 with English translation (corresponding to JP2017-532783).

Japanese Patent Office, Japanese Office Action and English translation issued in Japanese Patent Application No. 2017-532783, dated May 28. 2019, 10 pages.

Chinese Patent Office, Office Action and English translation issued in Chinese Patent Application No. 201580069549.9, dated Jun. 20, 2019, 14 pages.

* cited by examiner

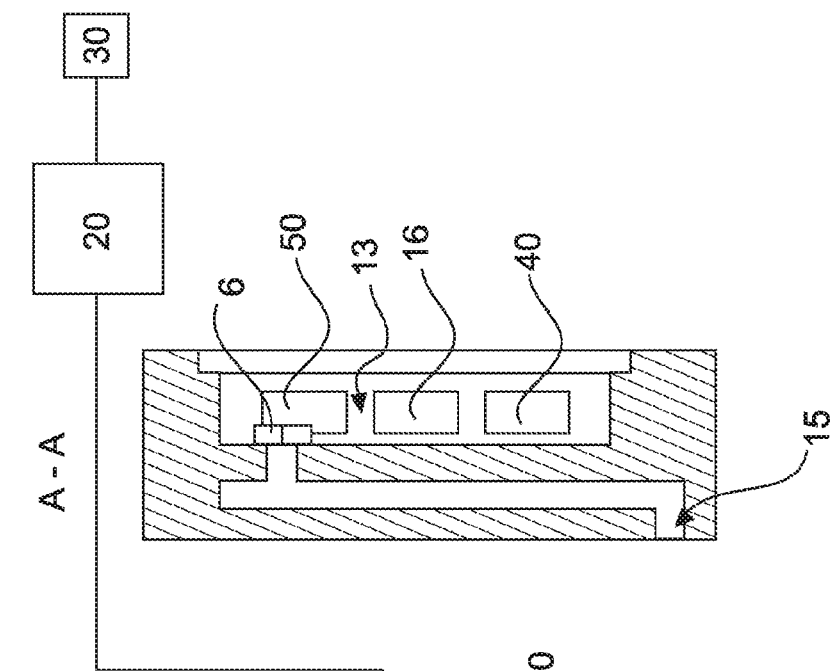
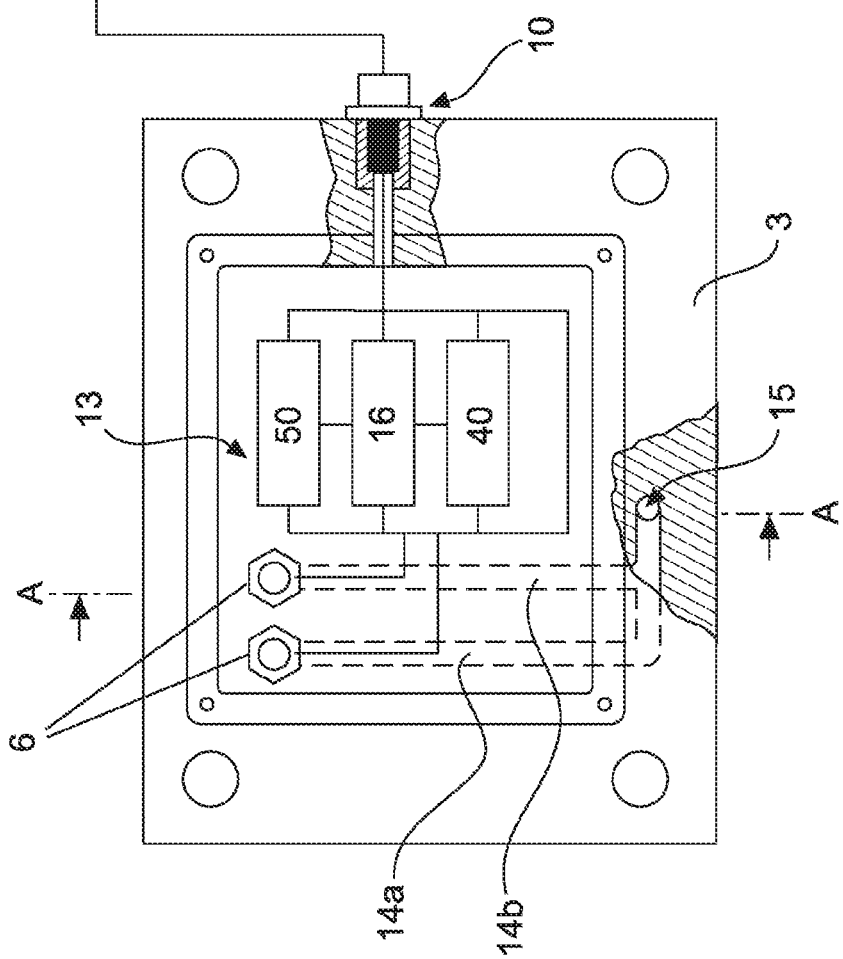
Fig. 2a
Fig. 2b

ALARM VALVE STATION OF A FIRE EXTINGUISHING SYSTEM, IN PARTICULAR A SPRINKLER OR SPRAY WATER EXTINGUISHING SYSTEM, AND FIRE EXTINGUISHING SYSTEM

CROSS-REFERENCE TO RELATED APPLICATIONS

This application is a National Stage of International Application No. PCT/EP2015/080592, filed Dec. 18, 2015 (now WO 2016/097341A1, published Jun. 23, 2016). The entire disclosures of each of the above applications are incorporated herein by reference.

FIELD

The disclosure concerns an alarm valve station of a fire extinguishing system, in particular a sprinkler or spray water extinguishing system, comprising a fire extinguishing system valve comprising a housing which has a fluid inlet chamber, a fluid outlet chamber and a closing body reciprocable between a blocking state and a release state, wherein the fluid inlet chamber and the fluid outlet chamber are separated from each other in the blocking state and communicate with each other in fluid-conducting relationship in the release state. The disclosure further concerns such a fire extinguishing system having an alarm valve station to which one or more fluid lines are connected.

BACKGROUND AND SUMMARY

The term fire extinguishing system valves is used in accordance with the present disclosure to denote the general kind of both passive and also active alarm valves which are designed for use in alarm valve stations of fire extinguishing systems, specifically fire extinguishing systems with water-based extinguishing agents (for example water, water with additives, water mist in the low-pressure and high-pressure area). The most prominent representatives of those types of valves in fire extinguishing systems using water-based extinguishing agents are wet and dry alarm valves, as well as spray water valves. In the field of fire extinguishing systems with gaseous extinguishing agents the term alarm valves is unusual, here reference is usually made to area valves or extinguishing agent control valves. The term "alarm valve" used in this specification also includes those types of valve.

According to the disclosure the term alarm valve station is used to denote the fire extinguishing system valve and its immediate functional environment. Besides the fire extinguishing system valve itself this includes all elements, in particular accessories, shut-off members, fitments and lines which are not to be associated with the extinguishing agent feed line and extinguishing agent discharge line, but are fitted to the fire extinguishing system valve or in the proximity thereof for measurement, alarm, control and monitoring purposes.

The term passive alarm valves is used to mean that they automatically open when a predetermined pressure difference between the inlet and outlet sides is exceeded, wherein generally an alarm is triggered by the valves themselves in reaction to the detection of that open state, for example indirectly by means of a pressure switch which is arranged in an external alarm passage and by way of which an alarm means like for example an electrically operated alarm bell is then controlled, and/or directly by control of the flow of an extinguishing agent to a hydraulically operated alarm means which is fluidically connected to the alarm valve, like for example a water-operated alarm bell. In part, instead of or in addition to hydraulically operated alarm bells, optical displays are also arranged in the region of the alarm valves so that, when a plurality of alarm valves arranged in parallel are involved, it is possible to better distinguish which of the alarm valves was opened.

The term active alarm valves is used to mean that the valves, after the input of a fire signal from an external fire detection means or as a function of external control interventions, actively enable the flow of fluid by opening of the valve and an alarm is triggered, as in the case of the passive alarm valves. What is common to the above-mentioned types of valve is that they are often installed in fire extinguishing systems over long period of time without having to be used and it is important for the valves to operate reliably in an emergency. This means that regular checking of the operability of the valves is indispensable.

Inspection of known fire extinguishing systems is effected at regular intervals, for example weekly, generally by staff of the fire extinguishing system operator. Inspection of the fire extinguishing system includes in particular checking the alarm function and reading off the signals from sensors (for example pressures, filling levels, temperatures) and/or checking whether the actuators of the fire extinguishing system are actuated as is desired. The sensors may involve mechanical sensors like manometers, but also sensors which convert the physical signal into an electrical/electronic signal.

For checking the alarm function of a fire extinguishing system it was hitherto necessary for a valve, for example a ball valve, to be opened manually to trigger flooding of one or more lines. That simulates triggering of an extinguishing process so that it is possible to check the alarm function. When triggering an extinguishing process an alarm signal is usually sent to a fire signalling and/or extinguishing control centre so that when an alarm signal is received at the fire signalling and/or extinguishing control centre it can be assumed that the alarm function of the fire extinguishing system is operating correctly. The valve is then closed again, the fire signalling and/or extinguishing control centre is reset and the fire extinguishing system is thus put into an operationally readiness state again. Consequently a high degree of involvement in terms of time and operating personnel is necessary to check the alarm function of a fire extinguishing system.

For reading off the display values of the sensors and/or checking whether actuators of a fire extinguishing system are actuated as is desired the fire signalling and/or extinguishing control centre is usually read out or control signals are passed by way of that centre to the actuators, which are connected in signal-conducting relationship to the corresponding sensors and/or actuators. The fire signalling and/or extinguishing control centre is however usually disposed in a separate room, particularly in the case of complex fire extinguishing systems. The maintenance staff, for example sprinkler maintenance, fitters or service operatives cannot therefore perform checking of the sensors and/or triggering of the control signal to the actuators directly at the alarm valve of a fire extinguishing system. That considerably increases the complication and expenditure involved in inspection, in particular with large systems.

The same also applies to the operations which occur during maintenance and which are required by the manufacturer of the fire extinguishing system for example on an annual basis. Hereinafter the inspection and maintenance activities are jointly denoted by the term maintenance.

Consequently the object of the disclosure is to provide an alarm valve station which at least partially overcomes the disadvantages known in the state of the art. In particular the object of the disclosure is to provide an alarm valve station which affords an increased level of user friendliness.

The disclosure attains that object in accordance with claim 1 in that the evaluation unit is connected in signal-conducting relationship to one or more actuators, and is adapted to control the actuator or actuators by means of the control commands. In this configuration the alarm valve station preferably has one or more sensors and the evaluation unit is adapted, preferably autonomously, to control the actuator or actuators in dependence on the sensor data thereat.

Further preferably in the embodiment in which the evaluation unit has a data interface, the evaluation unit is adapted to receive control commands by means of the data interface and is adapted to control the actuator or actuators by means of the received control commands which are preferably further processed. Insofar as reference is made to control command in accordance with the disclosure this is used to mean both signals which the evaluation unit passes to the actuators for control thereof without further processing, and also signals which the evaluation unit processes before it actuates the actuators by means of the signals which have been processed to afford control commands.

In that case the actuator can be an electrical or electromagnetic, hydraulic or pneumatic control drive which is known in principle, each with suitable actuating means.

The closing body preferably has an actuator as its control drive and the electronic evaluation unit is adapted to move the closing body selectively into the release position or the blocking position by means of the control drive.

Alternatively the closing body preferably has an actuator as a pilot control drive and the electronic evaluation unit is adapted to either lock or unlock the closing body by means of the pilot control drive. In the locked state, in spite of a possibly prevailing increased fluid pressure in the fluid inlet chamber, the closing body remains in the blocking position. In the unlocked state the fluid pressure in the fluid inlet chamber moves the closing body into the release position. Unlike the active fire extinguishing system valves described hereinbefore, which control the movement of the closing body in both directions, that is to say into the release position and from there also into the blocking position, valves with a pilot control drive form a hybrid form between passive and active valves. They can prevent release by means of the locking action, but do not actively restore the locking effect after release has occurred. They are also known by the term pilot-controlled alarm valves.

Alternatively or additionally the alarm valve station preferably has an alarm passage and a testing valve for flooding the alarm passage, wherein the testing valve has an actuator as its control drive and the electronic evaluation unit is adapted to move the testing valve selectively into the release position or the blocking position by means of the control drive. This embodiment has a dedicated valve arrangement, the so-called testing valve arrangement, which alternatively or in addition to the closing body disposed between the fluid inlet chamber and the fluid outlet chamber, of the fire extinguishing system valve, is disposed in the alarm passage. That testing valve arrangement is adapted to implement flooding of the alarm passage without in that case having to actuate the (main) closing body (depending on the respective configuration of the fire extinguishing system valve, either passively or by means of the control drive). Preferably the control drive of that testing valve arrangement is also remotely controllable, more specifically by means of the evaluation unit autonomously and/or by means of the data interface.

Upon remotely controllable opening of the closing body of the fire extinguishing system valve or the testing valve arrangement, a pressure rise caused by the flow of extinguishing fluid is sensed, for example by one or more pressure sensors disposed in the alarm passage, and can be subjected to further processing by means of the evaluation unit. The fact that this option of remote control is afforded means that the time and personnel involvement necessary for testing the operational readiness of the fire extinguishing system thus falls considerably.

The alarm passage is preferably in the form of a passage disposed internally in the fire extinguishing system valve and/or is in the form of an external line at the valve station.

Because of the evaluation unit which is connected in signal-conducting relationship to the control drive, manual actuation of the respective actuator, in particular the control drive, or pilot control drive of the closing body of the testing valve or the fire extinguishing system valve, is no longer absolutely necessary to check the alarm function of the alarm valve station. In the case of the alarm valve station according to the disclosure the possibility of choosing between a central control by way of a fire signalling centre or a remote control room, and/or decentral remote control by an operator in the field, is created by way of the data interface and the evaluation unit.

In a further preferred embodiment the alarm valve station has one or more sensors, wherein the electronic evaluation unit is connected in signal-conducting relationship to the sensor or sensors for receiving data, is adapted for data processing into at least one of state information or operating instructions and is adapted for transmitting the state information to a display unit.

According to the disclosure the term state information is used to denote in particular the blocking and release state of the closing body or the additional testing valve, data which are detected by sensors arranged in or on the alarm valve station, and in addition preferably the location of the valve, the valve type and data processing results which the electronic evaluation unit has ascertained on the basis of the received data. The term operating instructions is used to mean for example text messages which cause the observer to trigger certain functions, for example switching certain fitments on or off, evacuation of a room, implementation of functional tests and so forth.

The disclosure follows the approach of providing, with the evaluation unit of the alarm valve station, a data-processing intelligence which provides state information and/or operating instructions separately from monitoring by a control location, fire signalling centre and the like. That makes it possible for the operator to maintain and operate the alarm valve station without in that case always having to have recourse to data from the control location, fire signalling centre and the like.

The alarm valve station preferably has a display unit preferably adapted to receive and display the state information and/or operating instructions from the evaluation unit.

The display unit is preferably integrated in the housing of the fire extinguishing system valve or alternatively is arranged externally on the housing or in the proximity of the alarm valve station.

In a preferred embodiment the display unit and the evaluation unit are arranged in the housing of the fire extinguishing system valve or in a common housing arranged externally on the fire extinguishing system valve or in the proximity of the alarm valve station.

The signal-conducting connection between the evaluation unit and the sensor or sensors is selectively wired or wireless.

In a preferred embodiment the display unit is adapted to reproduce numerical values and/or text characters, for example in the form of an LCD or LED display. Alternatively or in addition the display however for example in an economical structural configuration may also have only individual LEDs or other lighting means adapted to reproduce digitally given states by lighting or not lighting up. The data can also be displayed on a mobile device in the near-field region by way of NFC.

Preferably the display unit is adapted to provide information in various languages. In particular software is implemented on the evaluation unit and/or display unit, which software can be updated.

Preferably the evaluation unit is adapted to record and provide the clock time and/or the operating hours of the fire extinguishing system valve and possibly the various components of the alarm valve station, and particularly preferably display same by means of the display unit. In particular the display unit is adapted to provide the display unit with a menu navigation system for display purposes, which allows the operator to call up state information like pressure and/or temperature data of the fire extinguishing system.

In particular the evaluation unit is adapted to implement automatic checking of the alarm function of the fire extinguishing system. Preferably the evaluation unit is adapted to open a testing valve of the fire extinguishing system or the fire extinguishing system valve at regular intervals, for example weekly, to trigger flooding of one or more lines. Further preferably the evaluation unit is adapted to detect operating states which change when flooding occurs, for example by a rise in pressure at pressure sensors fluidically connected to an alarm passage. The alarm valve station is further adapted, after flooding of the lines, to pass an alarm signal to a fire signalling and/or extinguishing control centre and/or the display unit.

Preferably the display unit is adapted to display information about the result of checking of the alarm function of the fire extinguishing system. Further preferably the evaluation unit and/or display unit is adapted to generate a signal about the successfully concluded alarm test for communication to the fire signalling and/or extinguishing control centre.

In particular the display unit has a menu navigation allowing the operator to establish a time interval for carrying out checking of the alarm function of the fire extinguishing system and/or the service time.

Further preferably the evaluation unit and/or display unit is adapted to store data from the sensor or sensors and the variation thereof in respect of time.

For that purpose it is optionally possible to integrate a battery backup or to provide a non-volatile electronic memory element.

An advantageous development of the alarm valve station according to the disclosure further provides that the display unit is in the form of a portable communication device, for example a mobile radio device. Portable communication devices like for example mobile radio devices usually already have suitable hardware and software which allow the implementation of corresponding display functions without major expenditure and without hardware-side expansion. Service and maintenance personnel regularly carry for example mobile radio devices which after installation of a suitable software application are adapted to provide a user with displays about given operating states. In this embodiment the display unit is not permanently arranged at the alarm valve station but only temporarily when the operator is working at the alarm valve station.

In a further preferred embodiment of the alarm valve station according to the disclosure the evaluation unit and/or display unit includes an input device for the input of control commands. Preferably the input device has pressure-sensitive input elements. In particular the pressure-sensitive input elements are in the form of press keys, buttons and/or in the form of a touchscreen.

Preferably the display unit in conjunction with the evaluation unit is adapted to sequentially guide the operator, for example when carrying out operating processes. For that purpose sequences of operating instructions which are to be performed by the operator can be stored in the evaluation unit and/or display unit. Alternatively the sequences can be stored outside the fire extinguishing system valve station, preferably in the fire signalling and/or extinguishing control centre, in which case the information displayed on the display unit is imported as required "from outside".

Further preferably the display unit in conjunction with the evaluation unit is adapted to guide the operator in situation terms, for example when looking for faults. For that purpose algorithms can be stored in the software of the evaluation unit, which have the result that situation state information and/or operating instructions are displayed at the display unit in dependence on the signals of the sensor or sensors arranged in or at the fire extinguishing system valve station.

In a particularly preferred embodiment arranged on the housing of the fire extinguishing system valve is a fixing device for reversibly releasably fixing the display unit. By virtue of the fact that a fixing device for reversibly releasably fixing the display unit is arranged on the housing of the fire extinguishing system valve, the display unit can be used either as a stationary device at the fire extinguishing system or it can be carried around by the user in the form of a portable device. If the display device is used as a stationary device the fixing device preferably ensures a robust and shock-resistant configuration and mounting of the display unit to the housing of the fire extinguishing system valve.

Preferably the fixing device includes screw means, plug-in means and/or clamping means for screwing, plugging or clamping the display unit to the housing of the fire extinguishing system valve. In particular the fixing device has a hinge adapted to change the setting angle or inclination of the fixed display device.

In a preferred embodiment the data interface is adapted for unidirectional or bidirectional data exchange with a remote data processing unit which is associated for example with a control location and/or fire signalling centre and/or extinguishing control centre. In that way the data processing unit can for example read out the state information provided at the data interface. The data interface is preferably wired or wireless, preferably being in the form of an LAN, WLAN or TCP/IP connection.

Preferably the display unit and the evaluation unit are connected in signal-conducting relationship by means of the data interface.

Alternatively the display unit and the evaluation unit are connected in signal-conducting relationship by means of a second dedicated data interface which is in the form of a USB interface, a PCI interface, a PCI express interface, a Thunderbolt interface, a WPAN interface, in particular VFIR-IrDA, IFIR-IrDA, Bluetooth, or NFC.

Particularly preferably the display unit and the evaluation unit are adapted for mutual identification by means of the dedicated interface and are preferably adapted to automatically produce the signal-conducting connection.

Preferably the data interface is adapted for the operating voltage supply for the elements integrated in the data extinguishing system valve and/or testing valve. Data exchange can be effected in wired or wireless fashion. By means of the data interface the detected pressure data of the pressure sensor and/or pressure data from a data memory and/or pressure data from externally arranged pressure sensors communicating with the data interface can be passed to an external data processing unit, for example to a fire signalling and/or extinguishing control centre. That makes it possible to check the operability of the fire extinguishing system valve by means of signal-technology processing and evaluation of the pressure data arriving there, without having to carry out an on-site inspection. It is only when, due to certain pressure data patterns, for example abrupt pressure drops, there is an indication that the functioning of the fire extinguishing system valve or the alarm valve station is limited, that an on-site inspection can be performed at the respective situation. Moreover, the transmission of the pressure data by means of the data interface permits actuation, triggered by means of the data processing unit, of additional external display means, preferably acoustic and/or optical alarm means and/or further (alphanumeric) displays.

Preferably the data processing unit is adapted to analyze the information read out from the data interface and in dependence on that analysis to trigger one, more or all of the following events: output of a message as to whether the fire extinguishing valve is operating correctly, output of a message as to whether there is a sufficiently high fluid pressure in the fluid line, and/or output of a message as to whether the fire extinguishing valve has been opened.

Instead of or in addition to pressure sensors further types of sensors are arranged at the alarm valve station or at or in the fire extinguishing system valve, the data from which sensors are communicated by means of the evaluation unit by way of the data interface and/or are evaluated by way of the evaluation unit and/or are processed by the data processing unit. These preferably include sensors for detecting temperatures, switching positions and filling levels. The description hereinafter relating to pressure sensors also correspondingly applies to the further types of sensor.

The term message is used in this respect in accordance with the following non-definitive list to denote an optical and/or acoustic signal, preferably with a pre-defined signal sequence, and further preferably for remote transmission an SMS, telephone or VOIP speech message, fax message, e-mail, IRC message, message in the form of an electronic push and pull notification, Internet protocol-based message, Ethernet protocol-based message and the like. The content of those messages is preferably stored in message data files.

In a further configuration of the disclosure the above-mentioned messages or message data files and/or state information are sent by the fire extinguishing system valve or the alarm valve station itself. State information is preferably information/signals about the change in the blocking or release state of the closing body of the fire extinguishing system valve, pressure values or notifications about pressure limit values being exceeded or undershot. For that purpose the data memory has predetermined message data files and/or at least one predefined pressure limit value. In dependence on the detected pressure values of the pressure sensor and comparison with the at least one predefined pressure limit value, preferably by the electronic evaluation unit, a message data file associated with that at least one predefined limit value is sent by the electronic evaluation unit, preferably by way of the data interface, when the pressure rises above or falls below the at least one predefined limit value. Reading-out of the data memory and/or an update of embedded software of the electronic evaluation unit and/or display unit and/or changing or inputting the at least one pressure limit value and/or one or more message data files is implemented by way of the data interface or a dedicated configuration interface, by way of a configuration means. Such a configuration interface is preferably at the fire extinguishing system valve or its housing or the evaluation unit or the display unit. In a particularly preferred embodiment that configuration interface is integrated in the housing cover of the fire extinguishing system valve.

Preferably a stationary or portable computer, handheld, smartphone or the like which is in signal-conducting relationship with the data interface or configuration interface is considered as the configuration means. The configuration means is preferably selected from the non-definitive list of the following device: notebook, tablet, smartphone, programming device, service device.

Reading-out of the data memory and/or an update of embedded software of the electronic evaluation unit and/or changing or inputting the at least one pressure limit value and/or one or more message data files is effected in an alternative embodiment by way of the data interface, preferably by means of the fire signalling and/or extinguishing control centre.

A further advantageous development of the disclosure provides that the data interface and the data processing unit are adapted for bidirectional wireless data exchange with each other. The bidirectional wireless data exchange is preferably effected by way of the Internet.

In a further preferred embodiment of the alarm valve station according to the disclosure one or more further valves are arranged at the one or more fluid lines and/or in an alarm passage, and are controllable, in particular remotely controllable, by means of the evaluation unit.

A further development of the alarm valve station according to the disclosure provides one or more electromagnetic drives which are controllable, in particular remotely controllable, by means of the evaluation unit.

In a preferred embodiment a pressure sensor is fluidically connected to the alarm passage. The alarm passage is preferably fluidically connected to the fluid inlet chamber and/or an extinguishing fluid supply as soon as the closing body is in the release position. In such an embodiment in which the fire extinguishing system valve has a testing valve, the alarm passage is preferably connected in fluidic relationship to the fluid inlet chamber and/or an extinguishing fluid supply as soon as the testing valve is opened. In the closed position of the testing valve which is provide in the alarm passage the downstream region, that is to say after the testing valve in the flow direction, is pressure-less and is at least predominantly and preferably completely free of extinguishing fluid. In the opened position of the testing valve preferably the same pressure builds up in the alarm passage and the components connected thereto like the pressure sensor, as in the fluid inlet chamber of the fire extinguishing system valve, which is assessed as and displayed as an alarm.

In a further preferred embodiment on the fire extinguishing system valve, preferably a wet alarm valve, a preferably electromagnetically actuated valve, preferably a testing valve, is fluidically connected to the fluid outlet chamber of the fire extinguishing system valve on the one hand and to the environment on the other hand. In the closed position of the testing valve the closing body of the fire extinguishing system valve is closed and no extinguishing fluid flows. In the opened position of the testing valve extinguishing fluid flows out of the fluid outlet chamber into the environment. With suitable dimensioning of the solenoid valve such a large volume flow flows into the environment that the closing body of the fire extinguishing system valve is opened. Preferably the fire extinguishing system valve has an alarm passage which is connected in fluid-conducting relationship to the closing body and in which at least one pressure sensor is arranged. That pressure sensor then detects the pressure building up with the testing valve in the opened condition, in the alarm passage, which is preferably displayed as an alarm by the display unit.

In a further preferred embodiment arranged on the fire extinguishing system valve is a preferably electromagnetically actuated piston which holds the closing body of the fire extinguishing system valve in the blocked position. When the drive is not actuated the piston is in a rest position which mechanically blocks opening of the closing body. Upon actuation of the electromagnetic drive the piston is moved out of its rest position and in so doing enables the path of movement of the closing body. Actuation of the drive allows direct remotely controlled opening of fire extinguishing system valves, preferably spray water valves.

A further development of the alarm valve station according to the disclosure provides one or more optical and/or acoustic alarm means controllable, in particular remotely controllable, by means of the evaluation unit. Preferably the optical and/or acoustic alarm means are integrated in the display unit or are arranged in the form of separate components in the proximity of the alarm valve station. Preferably one or more optical alarm means are in the form of flashing lamps. Further preferably one or more acoustic alarm means is in the form of a horn on the alarm valve station. In connection with the disclosure the term near region is used to denote the region of 5 m or less, preferably 3 m or less, further preferably 2 m or less, in particular 1 m and less, around the fire extinguishing system valve.

Preferably the fire extinguishing system includes a plurality of lamp means, in particular LED units, of differing colors. A graduated display concept can be implemented by means of lamps of different colors. For example illumination of a red lamp signals that a fire was detected, illumination of a yellow lamp signals that there is a fault and illumination of a green lamp means that neither a fire was detected nor is there a fault in the fire extinguishing system.

In a further preferred embodiment of the fire extinguishing system at least one pressure sensor is arranged in the housing. In accordance with the disclosure integrated is used to mean that the pressure sensor is installed in the housing of the valve, in other words it is mounted or encased therein, in such a way that no flanges, pipe connections or the like as additional fluid-carrying fitments have to be provided externally on the valve or indeed separately in relation to the valve in order to be able to perform the above-mentioned pressure measurement. The number of components to be installed in the fire extinguishing system is markedly reduced by integration of the function of the pressure sensor in the valve housing. Assembly and packaging of the fire extinguishing system valve is also preferably already completed in manufacture, that is to say before being taken to the location of use and prior to the actual fitment operation, so that the time factor can also be already minimized when the fire extinguishing system is being commissioned.

Further preferably the use of the alarm valve according to the disclosure in one of the described embodiments makes it possible to dispense with electrical connecting lines: a) between electrically operated alarm means or displays arranged near the alarm valve and a remotely arranged fire signalling and/or extinguishing control centre, and b) between pressure sensors arranged near the alarm valve and a remotely arranged fire signalling and/or extinguishing control centre.

The pressure sensor is preferably adapted to detect the pressure prevailing in the fluid inlet chamber. In an embodiment a pressure sensor in the form of a pressure switch is preferred, which as it were digitally registers when the pressure reaches a limit value or rises above/falls below the limit value. A pressure limit value is predetermined with the choice of a pressure switch or a defined setting of the pressure switch. The pressure switch supplies as pressure data the information as to whether the switching pressure applies or not (1/0). A pressure measuring pickup is particularly preferred, which can detect the actually applied pressure and output it in the form of a discrete signal value by means of suitable conversion means. In preferred embodiments the pressure sensor can have converters, amplifiers, microcontrollers and the like which are required for that purpose in generally known fashion.

Further preferably the pressure sensor is adapted to detect the pressure prevailing in the fluid outlet chamber and/or in the fluid inlet chamber. If the pressure is to be detected both in the fluid inlet chamber and also in the fluid outlet chamber it is preferred that there are provided a first pressure sensor and a second pressure sensor which are both integrated in the housing and of which a respective pressure sensor is operatively arranged in the fluid inlet or fluid outlet chamber.

In a particularly preferred embodiment the pressure sensor is adapted to detect the pressure prevailing in an alarm passage.

In that respect, the pressure sensor or a measuring head of the pressure sensor can be arranged selectively directly in the fluid inlet chamber, the fluid outlet chamber, or in an alarm passage integrated in the valve. The alarm passage is preferably fluid-tightly separated from the fluid chambers of the valve in the blocking position of the closing body. Preferably ambient pressure prevails in the alarm passage. It is only when the closing body is moved from the blocking position into the release position that the alarm passage communicates with the adjoining fluid chambers which are now also connected.

In a further preferred embodiment the pressure sensor is connected to the display unit and/or evaluation unit for output of the detected pressure data and/or for output of information ascertained in dependence on the detected pressure data. The use of the alarm valve according to the disclosure in this embodiment allows the user to have displays, near the alarm valve, relating to certain operating states which go beyond pure pressure information, for example recommendations/instructions, in the form of clear text.

In a preferred embodiment the pressure sensor which is preferably in the form of a pressure switch is in the form of a separate component outside the alarm valve, preferably within an alarm passage and/or at a line fluidically connected to the alarm passage. In particular a further display unit is fixed to or integrated in the pressure sensor. In a particularly preferred embodiment the further display unit is reversibly releasably fixed to the pressure sensor by means of a fixing device.

In a further preferred embodiment the pressure sensor is connected to a data memory for storing the detected pressure data. That makes it possible to not merely detect the respectively instantaneous pressure value, but to detect a history of the variation in the pressure value and provide it for subsequent evaluation.

In a further preferred embodiment the pressure sensor and/or the data memory and/or one or more external pressure sensors are connected to the data interface for reading out and remotely transmitting the detected pressure data. The data interface preferably includes one or more connections for data communication.

The electronic evaluation unit is preferably connected to one, more or all following elements for receiving data and/or for transmitting state information of the valve: the at least one pressure sensor, the data interface, the data memory, and one or more external pressure sensors. Reception of data is considered in particular from sensors, preferably from the pressure sensor and/or the data memory and/or the data interface. Transmission of data is effected in particular in the direction of the display unit and/or the data interface. The state information is in particular also the pressure data received from the pressure sensor and/or the data memory and possibly data processing results which the electronic evaluation unit has implemented on the basis of the received data. Preferably a so-called addressing module is provided in the electronic evaluation unit for networking the valve by means of the data interface generally and for location communication in particular. If the data interface is in the form for example of a ring bus the evaluation unit, by means of the addressing module, can output further information like the location in addition to or jointly with the information in respect of the pressure data.

The addressing module is preferably adapted to be plugged in and/or interchangeable, being connected by way of a signal line to a ring bus subscriber module of a central control unit, for example a fire signalling and/or extinguishing control centre. In that way the addressing module is an addressable subscriber on the signal line which is preferably in the form of a ring bus line. Preferably the address of the addressing module is settable. The addressing module sends data by way of the ring bus. In a preferred configuration the detected pressure values or detected changes in pressure or the occurrence of a change in pressure or disturbances are transmitted to the ring bus subscriber module by means of a data transmission protocol.

In an advantageous embodiment the signal line is in the form of a closed ring bus line. That has the advantage that, upon an interruption in that signal line, for example in the event of wire breakage, the power supply and communication with the addressable subscribers is ensured from both sides of the former ring by way of the ring bus subscriber module. In a further advantageous configuration that signal line is in the form of a stub line for addressable subscribers.

The electronic evaluation unit is preferably adapted to compare pressure data obtained from the pressure sensor and/or the data memory and/or one or more external pressure sensors to predefine limit values and, when the pressure reaches or rises above or falls below those limit values, to transmit a representative signal as a state definition.

Particularly preferably one, more or all of the following elements are integrated in the housing of the fire extinguishing system valve or the display unit: the data interface, the data memory and the electronic evaluation unit.

In a further preferred development of the disclosure the housing of the fire extinguishing system valve has a housing cover, preferably a hand hole cover, wherein in particular one, more or all of the following elements are integrated in the housing cover: the pressure sensor, the data interface, the data memory and the electronic evaluation unit. In that way it is possible to reduce the component diversity in a series of fire extinguishing system valves without having to compromise function diversity. It is possible to produce a universal housing body which has suitable openings for all functionalities afforded and housing covers of differing configuration. By allocating the respective housing cover with its functionalities integrated therein with the universal housing body the respectively different functions of the fire extinguishing system valve are then brought together. That modular system according to the disclosure further makes it possible subsequently, in relation to existing fire extinguishing systems, to add additional functions or to remove functions which are not required in practice, by changing the housing cover. All that is achieved without removing fitments on the existing fire extinguishing system or having to subsequently install same, which would respectively involve a high level of cost and complication and possible leaks. The housing cover, for example in the embodiment in the form of a hand hole cover, preferably has known and tried-and-tested sealing mechanisms which allow reliable use.

In a preferred embodiment the display unit is integrated in the housing cover of the fire extinguishing system valve. Alternatively the display unit is preferably mounted by means of a pivoting mechanism to the fire extinguishing system valve, for example to the housing, in particular to the housing cover. Alternatively the display unit is arranged on a pressure switch externally to the housing of the valve.

In a further preferred embodiment the display unit is reversibly releasably connected to the alarm valve, for example by means of integration in the housing cover, and has a signal-conducting connection to the electronic evaluation unit which upon assembly of the display unit to the alarm valve, is automatically implemented and which is automatically separated when the display unit is separated from the alarm valve. Preferably arranged on the alarm valve are contacts which in the assembled condition are conductively connected to correspondingly arranged contacts on the display unit and which are separated from the correspondingly arranged contacts on the display unit as soon as the display unit is removed from the alarm valve.

In a further preferred embodiment the display unit and/or evaluation unit is spatially integrated in the alarm valve station, that is to say it is associated with the fire extinguishing system valve in spatially immediate relationship. It is characteristic in that respect that a display unit and/or evaluation unit is associated with an individual fire extinguishing system valve station, preferably by arranging the housing of the display unit and/or evaluation unit on the fire extinguishing system valve or its inlet-side or outlet-side extinguishing fluid line.

Preferably the evaluation unit is adapted to generate a signal indicating a problem and to provide it in the data memory or at the data interface as soon as the display unit is separated from the evaluation unit.

In a further preferred embodiment the display unit has a dedicated data interface for at least incoming, preferably bidirectional, data communication with an external data source. The external data source is preferably a fire signalling or extinguishing control centre.

In a further preferred embodiment the evaluation unit is adapted to recognise certain predetermined states of the valve extinguishing system valve in dependence on the state information of the fire extinguishing system valve and as a reaction to the detected states to actuate the display unit for displaying an operating recommendation appropriate for the state. The management recommendation is for example display of the message "excessively low pressure" and/or "start pressure generator" if an excessively low pressure value is communicated by the pressure sensor or sensors. Further by way of example the recommendation reads "fire in the extinguishing area X" and/or "evacuate building Y" when an alarm state is detected.

The housing cover, in particular in the form of a hand hole cover, upon temporary removal thereof, preferably allows access to the fluid inlet chamber and/or fluid outlet chamber and particularly preferably the closing body. When the pressure sensor is integrated in the housing cover suitable fluid line passages are preferably provided for the pressure sensor or, when there are a plurality of pressure sensors, for each pressure sensor, the passage is being in the form of recesses in which the pressure sensor can respectively be placed. It is possible for example to use sensors with integrated ND converter, as well as optionally amplifiers, microcontrollers and the like, or sensors which are connected to an ND converter also integrated in the housing cover. Simpler types of sensor, like for example pressure switches, can similarly be disposed in the housing cover. The same also applies to the other above-mentioned integration elements.

The fire extinguishing system valve is preferably a wet alarm valve or a dry alarm valve or a spray water valve. This also embraces "special configurations" of those types of alarm valve and combinations thereof, as are known as pilot controlled dry systems. The valve of such a respective configuration has the further technical means which are usual in this art and the description of which is dispensed with here to provide a concise description. In operation the above-mentioned types of valve primarily differ in the way in which the pressure levels in the different valve chambers change. In operation of a wet alarm valve for example a certain fluid pressure p2 occurs in the fluid outlet chamber filled with extinguishing fluid, with the sprinkler nozzles closed, while a pressure p1 prevails in the fluid inlet chamber. The pressures p1 and p2 can be approximately equal or equal and are preferably in the range of 1 to 25 bars. The pressure in the fluid outlet chamber (p2) falls as soon as the sprinkler nozzles open. As soon as a given pressure drop between p2 and the pressure p1 is reached or exceeded in the fluid inlet chamber, the closing body of the valve opens with a time delay, whereby the pressure p1 in the fluid inlet chamber also changes. The hitherto static pressure firstly falls immediately after opening of the valve and a fresh pressure p3 gradually prevails, defined as a flow pressure. If the valve has an alarm passage in which ambient pressure prevails in the blocking position of the closing body, a pressure rise is to be noted in that alarm passage with opening of the valve to the release position.

In the case of dry alarm valves the fluid outlet chamber (downstream of the closing body) is filled with a gas under an increased pressure, preferably at p2 of 0.8 to 4 bars. The fluid inlet pressure is preferably water-filled with p1 in a range of 1 to about 25 bars, the pressure details being respectively relative to ambient pressure. If the valve has an alarm passage in which ambient pressure prevails in the blocking position of the closing body, a rise in pressure is to be noted in that alarm passage with opening of the valve to the release position.

Preferably the fire extinguishing system valve has up to three pressure sensors which are integrated in the valve and which respectively monitor the pressure in the fluid inlet chamber, the fluid outlet chamber and/or the alarm passage.

Wet alarm valves are described for example in EN 12259-2, dry alarm valves in EN 12259-3 and spray water valves in prEN 12259-9. In addition those valve types are described in the test and approval specifications of private installations like VdS SchadenverhUtung, Cologne, FM Global, West Gloucester or UL, Northbrook.

In a further preferred configuration the sensor or sensors include one or more pressure sensors which are preferably integrated in the housing.

A further development of the alarm valve station according to the disclosure provides one or more temperature sensors adapted to detect the fluid temperature within the fire extinguishing system valve or one or more of the further components of the alarm valve station and/or the ambient temperature. Preferably the one or more temperature sensors is or are connected in signal-conducting relationship to the display unit for output of the detected temperature data. The evaluation unit and/or the display unit preferably have a device for time detection. The one or more temperature sensors is or are preferably connected in signal-conducting relationship by way of the evaluation unit to the display unit and/or the evaluation unit.

A particularly preferred embodiment of the alarm valve station according to the disclosure has one or more measuring devices for detecting the water hardness and for detecting a flow speed. Preferably the alarm valve station according to the disclosure has one or more measuring devices for detecting the pH value and/or conductivity of the water. Preferably the alarm valve station according to the disclosure has one or more internal measuring devices for detecting the water level in a dry tube, by which it is possible to establish whether the dry tube has to be emptied.

Preferably the alarm valve station according to the disclosure has one or more internal measuring devices for detecting opening of the housing cover. It is possible in that way to record the housing openings implemented. The one or more measuring devices are preferably connected in signal-conducting relationship to the display unit for output of the detected measurement data. The one or more measuring devices is or are preferably connected in signal-conducting relationship by way of the evaluation unit to the display unit.

In the case of a fire extinguishing system of the kind set forth in the opening part of this specification the disclosure attains its object in that said one alarm valve station is in accordance with one of the above-described embodiments. In regard to the advantages afforded thereby attention is directed to the foregoing description.

The preferred embodiments and developments of the alarm valve station described herein are at the same time also preferred embodiments of the fire extinguishing system. Preferred embodiments or developments of the fire extinguishing system described herein are at the same time preferred embodiments of the alarm valve station.

DRAWINGS

The disclosure is described in greater detail hereinafter with reference to the accompanying Figures and by means of preferred embodiments by way of example.

Figure 3:
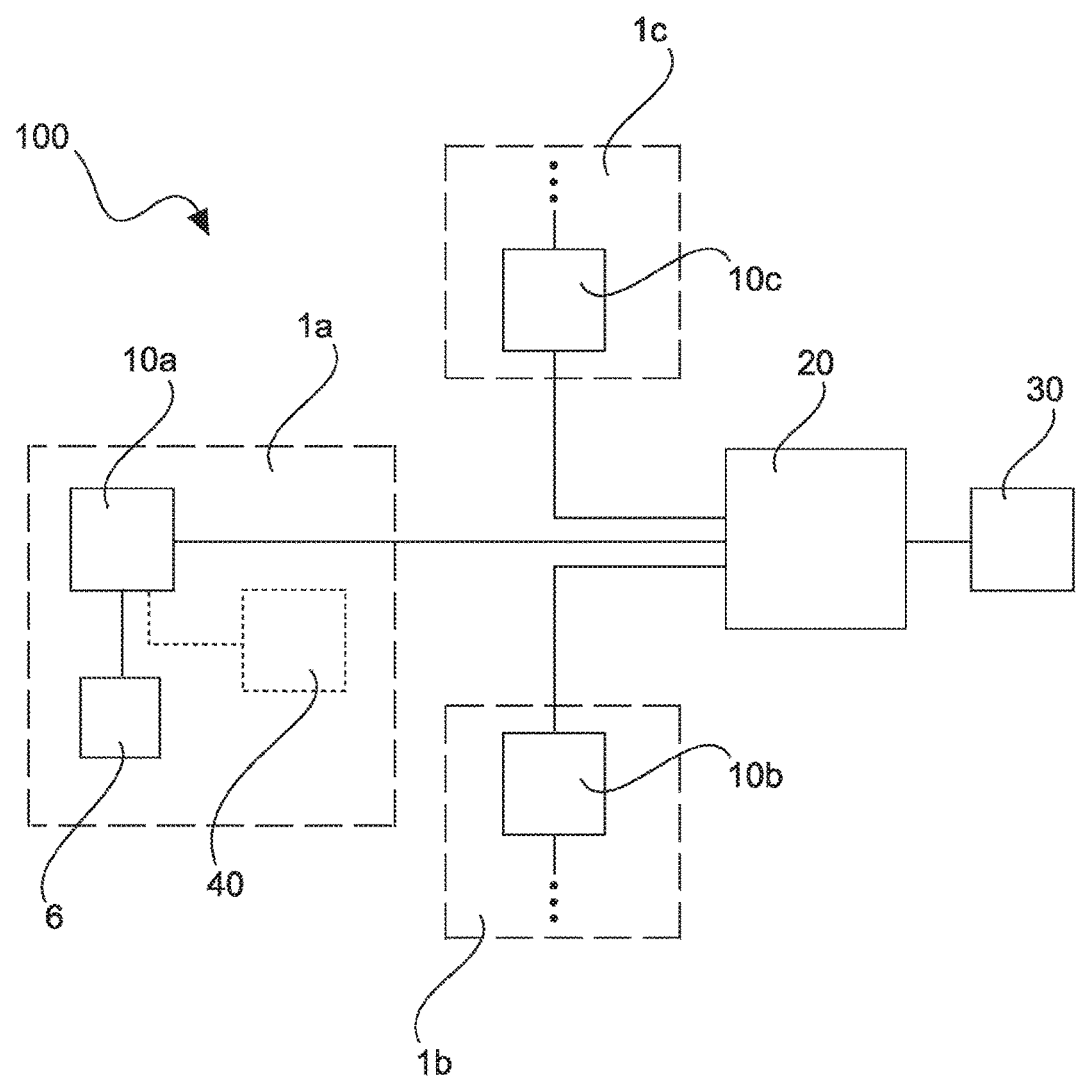
Figure 4:
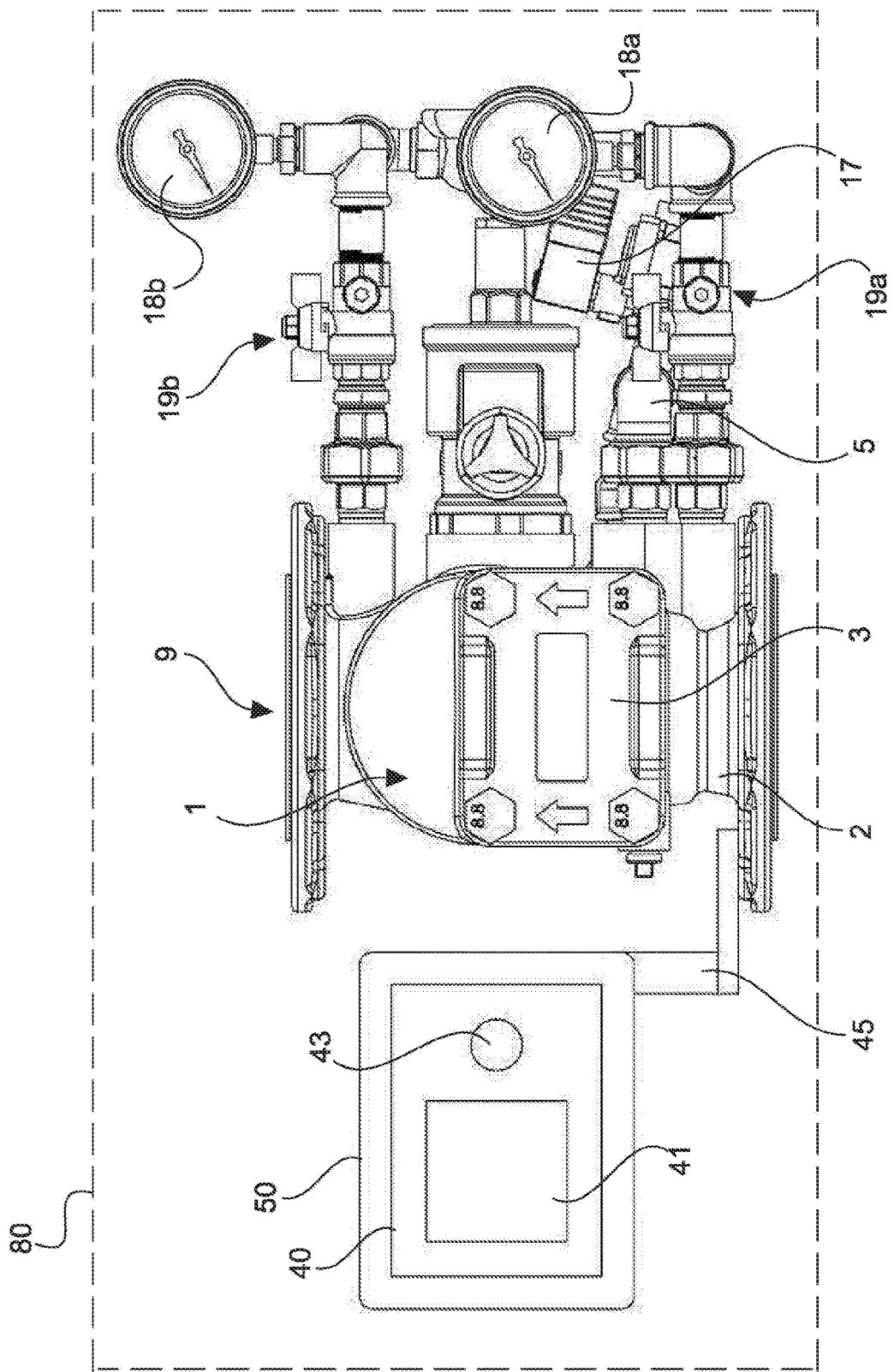
Figure 5:
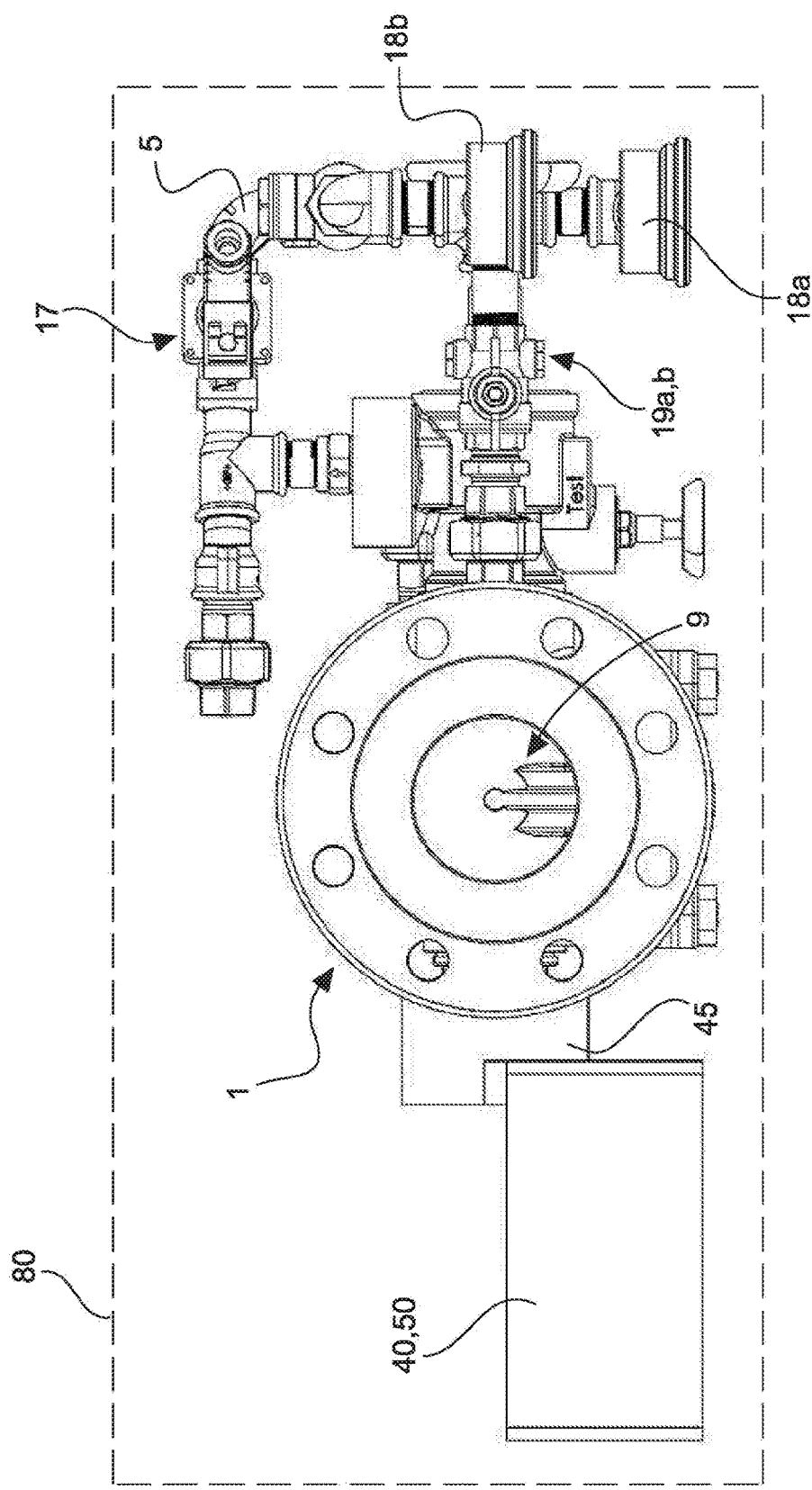
Figure 6:
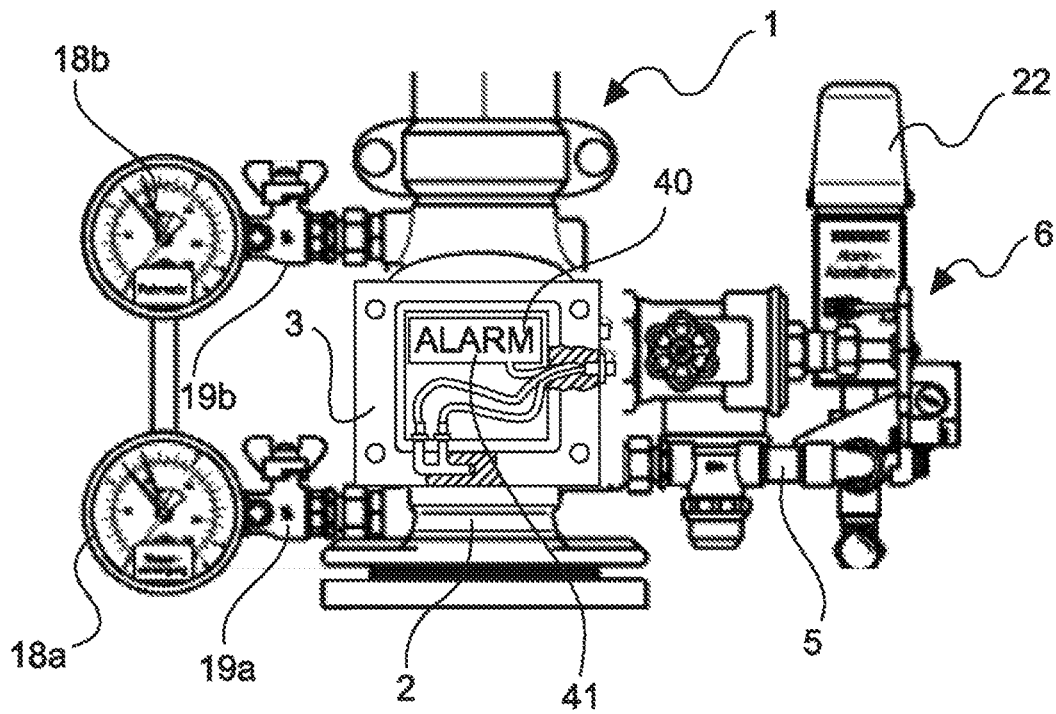
Figure 7:
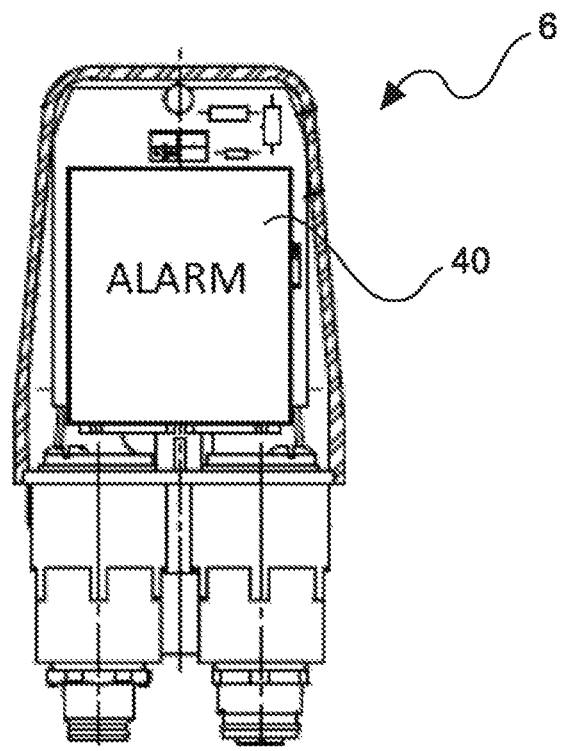

In the Figures:

FIG. 1 shows a diagrammatic view of an embodiment of a fire extinguishing system according to the disclosure together with an alarm valve station, FIGS. 2a and b show diagrammatic views of a housing cover for a fire extinguishing system valve of the fire extinguishing system according to the disclosure, FIG. 3 shows a diagrammatic view of an embodiment of a fire extinguishing system according to the disclosure, FIG. 4 shows a diagrammatic view of a further embodiment of a fire extinguishing system according to the disclosure, FIG. 5 shows a plan view of the fire extinguishing system of FIG. 4, FIG. 6 shows a diagrammatic view of a fire extinguishing system valve of the fire extinguishing system according to the disclosure, and FIG. 7 shows a diagrammatic view of a pressure sensor of the fire extinguishing system according to the disclosure.

DETAILED DESCRIPTION

The fire extinguishing system 100 in FIG. 1 is in the form of a sprinkler extinguishing system and has a fire extinguishing system valve 1, a plurality of fluid lines 11 and a display unit 40. The fire extinguishing system valve 1 and the display unit 40 are component parts of an alarm valve station 80.

The fire extinguishing system valve 1 for blocking and opening the fluid lines 11 includes a housing 2, 3 having a fluid inlet chamber 8, a fluid outlet chamber 9 and a closing body 4a reciprocable between a blocking state and a release state. Reciprocal includes here not only a translatory movement but also rotatory and other forms of movement. The fluid inlet chamber 8 and the fluid outlet chamber 9 are separated from each other in the blocking state and are in fluid-communicating relationship with each other in the release state. Integrated into the housing 2 is the alarm passage 5 which is in communication with the valve seat 4b and in which a pressure sensor 6 is operatively disposed. The pressure sensor 6 is integrated in the housing cover 3 of the housing 2. A data interface 10 is passed outwardly by way of a signal-conducting connection, and can be picked up from outside on the housing cover 3.

The fire extinguishing system valve 1 is arranged in a fluid line 11 adapted to feed extinguishing fluid to the plurality of sprinkler nozzles 12.

In addition the alarm valve station 80, preferably the fire extinguishing system valve 1, has an electronic evaluation unit 50 which is connected in signal-conducting relationship to the display unit 40 for receiving data and for transmitting state information of the valve 1 and/or operating instructions.

In the illustrated embodiment the closing body 4a is in the form of a wet alarm valve station without a dedicated actuator, but optionally can have such an actuator (not shown) as its control drive. The electronic evaluation unit 50 is then adapted to move the closing body 4a selectively into the release position or the blocking position by means of the control drive.

The display unit 40 is adapted to provide a user with displays about given operating states and/or to instruct the user. The display unit 40 is adapted to reproduce numerical values and text characters and graphics and images. The display unit 40 includes an LCD display 41 and is in the form of a portable mobile radio device. The display unit 40 further includes an input device 43 for the input of control commands and information, the input device 43 having pressure-sensitive input elements. The pressure-sensitive input elements are press buttons.

The fire extinguishing system valve 1 further has a temperature sensor 70 adapted to detect the fluid temperature within the fire extinguishing system valve 1. The temperature sensors 20 are connected in signal-conducting relationship by way of the evaluation unit 50 to the display unit 40 for output of the detected temperature data.

In addition the fire extinguishing system 100 has two internal measuring devices 21a, b. The first internal measuring device 21a is adapted to detect water hardness and the second internal measuring device 21b is adapted to detect a flow speed. The internal measuring devices 21 are connected in signal-conducting relationship by way of the evaluation unit 50 to the display unit 40 for output of the detected measurement data as state information.

A housing cover 3 is a component part of the housing 2 and is screwed fluid-tightly thereto.

In the interior of the housing 2 the closing body 4a is arranged on a valve seat 4b, a seal 7 providing for fluid-tight separation of the fluid inlet chamber 8 and the fluid outlet chamber 9 with respect to the alarm passage 5.

Unlike the structure shown in FIG. 1 in FIGS. 2a and 2b the display unit 40 and the evaluation unit 50 are integrated in the housing cover 3 of the housing 2. The housing cover 3 is in the form of a hand hole cover. In the illustrated embodiment the housing cover 3 has a recess 13 which is provided with a transparent cover member and which is recessed in the side that is remote from the housing 2 in the mounted state of the housing cover 3. Arranged in the recess 13 are a first and a second pressure sensor 6 respectively connected by way of a fluid line 14a, b as a redundant system to a fluid port 15. The fluid port 15 is so positioned that when the housing cover 3 is mounted on the housing 2 it is connected in fluid-conducting relationship to the alarm passage 5. For reasons of clarity the Figures do not show an emptying device for automatically emptying the alarm passage when the closing body 4a is closed. As an alternative to the arrangement shown here it would also be possible to connect a plurality of pressure sensors to different fluid ports, wherein each fluid port is connected in fluid-conducting relationship to another fluid chamber of the housing in order to be able to simultaneously measure the different pressures prevailing at various locations of the alarm valve.

The pressure sensors 6 are respectively connected in signal-conducting relationship to an evaluation unit 50. The pressure sensors 6 and the evaluation unit 50 are communicated with each other in such a way that the evaluation unit 50 can detect and process the pressure data output by the pressure sensors 6. The evaluation unit 50 is connected in data-connecting relationship to a data memory 16 and is adapted to store data processing results in the data memory 16 and/or to read in and process data stored in the data memory, in particular pressure data, from the pressure sensors 6.

Optionally the data memory 16 is alternatively or additionally directly connected to the pressure sensors 6 in data-conducting relationship in order to store pressure data received from same.

The evaluation unit 50 is optionally alternatively or additionally connected in data-conducting relationship to a display unit 40 and is adapted to feed the display unit 50 with information which can be called up, in particular state information of the fire extinguishing system valve 1.

The various possible data connections between the pressure sensors, the evaluation unit 50, the data memory 16 and the display unit 40 as well as the data interface 10 are shown by way of example by lines in FIG. 2a.

The data memory 16, the display unit 40, the electronic evaluation unit 50, the pressure sensors 6 and the data interface 10 are functionally independent units which as an alternative to the embodiment shown by way of example can also be integrated in separate recesses or mounting means in the housing 2 or in the housing cover 3. Depending on the respective functional content of the fire extinguishing system valve, that is desired by the customer, preferred embodiments provide that not all of the illustrated elements but only individual elements or sub-combinations of the elements are integrated in the housing or the housing cover.

The data interface 10 is connected to a data processing unit 20 by way of remote data transmission means. The data processing unit is adapted to process the information read in from the data interface 10 and/or to pass it on, for example to output it to external display means 30 and/or in the form of alarm notifications, depending on what kind of state information the data interface 10 provides.

As an alternative to the integration in the housing cover as shown here, one, more or all of the integrated elements shown in FIGS. 2a and 2b can be integrated in another region of the housing 2 of the fire extinguishing system valve 1, or for example also in an intermediate flange fitted between the main housing 2 and the housing cover 3. The basic mode of operation is preferably the same as in the embodiment shown here.

FIG. 3 diagrammatically shows a fire extinguishing system 100. The fire extinguishing system 100 monitors a plurality of fire extinguishing system valves 1a, b, c insofar as it communicates in data-conducting relationship with respective data interfaces 10a, b, c provided at the fire extinguishing system valves 1a, b, c and calls up state information provided thereby. The state information is processed in a data processing unit 20 and for example either passed to external display means 30 or returned to the fire extinguishing system valves 1a, b, c and reproduced there on internal display units 40. Optionally the data processing unit 20 is adapted to control the valves 1a, b, c by means of suitable control commands, for example to close or open the closing bodies thereof.

The valves 1a, b, c operate in operation in such a way that at least one of the pressures in the fluid inlet chamber and/or fluid outlet chamber and/or in the alarm passage is permanently monitored. The pressure data obtained in that way are processed by the electronic evaluation unit 50 or the data processing unit 20, in particular being compared to predetermined limit values. The pressure data and/or deviations from a target pressure pattern or situations where the pressure rises above or falls below the predetermined limit values are recorded for example in the data memory 16 of the fire extinguishing system valves or a data memory (not shown) of the data processing unit 20. If for example the pressure in the fluid inlet chamber drops although the closing body is signalled as being in the locking position then the data processing unit or the evaluation unit is preferably adapted to output a corresponding fault signal. If for example the pressure in the alarm passage—which in the readiness condition is at atmospheric pressure—rises due to opening of the alarm valve then the data processing unit or the evaluation unit is preferably adapted to output a corresponding alarm signal.

If for example the pressure in the fluid outlet chamber falls below a given limit value, for example after triggering of the sprinkler nozzles, being the value below which the closing body should open but in spite of the signal from the valve that the closing body is in the release position, no change in pressure occurs in the fluid inlet region and/or the alarm passage, then the data processing unit is preferably adapted to also output for that purpose a corresponding signal for the presumed disruption.

In a similar manner, the occurrence of leaks or other functional disruptions can be remotely detected by means of ongoing pressure monitoring in the interior of the fire extinguishing system valve. Manual maintenance interventions can then be started in specifically targeted fashion. That is especially the case if the location and the type of the fire extinguishing system valve are also communicated in the state information in respect of the valve, and if there is a clear text display. That simplifies briefing the maintenance personnel with instructions.

Referring to FIGS. 4 and 5 arranged on the housing 2, 3 of the fire extinguishing system valve 1 which is in the form of a wet alarm valve is a fixing device 45 for reversibly releasable fixing of the display unit 40. The display unit 40 includes an input device 43 for the input of control commands, the input device 43 having a pressure-sensitive input element which is in the form of a press button. An electronic evaluation unit 50 is integrated in the display unit 40. The evaluation unit 50, with the display unit, forms an integral unit arranged externally on the fire extinguishing system valve.

The display unit 40 includes a display 41 and three LED units of differing colors. A graduated display concept can be implemented by means of the three LED units. Lighting of the red LED unit signals that a fire was detected, lighting of the yellow LED unit signals that there is a disruption, and lighting of the green LED unit signals that neither was a fire detected nor is there a disruption in the fire extinguishing system.

The fixing device 45 has plug means for reversibly releasably plugging the display unit 40 to the housing 2 of the fire extinguishing system valve 1. The fixing device 45 further has a hinge adapted to change the setting angle or the inclination of the fixed display unit 40.

Extending between the fluid inlet chamber and the fluid outlet chamber 9 of the fire extinguishing system valve 1 is a compensating line, by means of which it is possible to produce a fluid-conducting connection between the fluid inlet chamber and the fluid outlet chamber 9, by-passing the closing body. Arranged along the compensating line are two valves with a shut-off tap 19a, 19b and two manometers 18a, 18b as well as a non-return valve (not referenced).

The alarm passage 5 which in FIGS. 4 and 5 is prolonged in the form of an external line connects the fire extinguishing system valve 1 by way of a testing valve 17 to a pressure sensor (not shown) in the form of a pressure switch. In operation a given fluid pressure p2 prevails in the fluid outlet chamber 9 filled with extinguishing fluid, with the sprinkler nozzles closed, while a pressure p1 prevails in the fluid inlet chamber. The pressures p1 and p2 can be approximately equal or equal and are preferably in the range of 1 to 25 bars. The pressure in the fluid outlet chamber 9, being p2, falls as soon as the sprinkler nozzles open. As soon as a certain pressure drop between p2 and the pressure p1 in the fluid inlet chamber is reached or exceeded, the closing body of the valve 1 opens with a time delay, whereby the pressure p1 in the fluid inlet chamber also changes. The previously static pressure firstly falls directly after opening of the valve and a new pressure p3 gradually obtains, defined as flow pressure. Upon opening of the valve 1 there is also a change in pressure in the alarm passage, that is detected by the pressure sensor. As a consequence of the signal from the pressure sensor, when a change in pressure is detected, a suitable alarm signal is triggered, for example to a fire signalling and/or extinguishing control centre.

Referring to FIG. 6 the display unit 40 with display 41 is integrated in the housing cover 3 of the fire extinguishing system valve 1. The fluid inlet chamber of the fire extinguishing system valve 1 is connected in fluid-conducting relationship to an alarm passage 5 which is prolonged in the form of an external line. The alarm passage 5 is in turn connected to a pressure sensor 6 which is in the form of a pressure switch and which detects a change in pressure in the alarm passage 5, the change in the pressure thereof initiating an alarm signal, which in turn causes activation of the alarm means 22. The alarm means 22 can be an optical signalling means, for example a flashing lamp, or an acoustic signalling means, for example a horn.

Alternatively or in addition further components of the alarm valve station according to the disclosure can have a display unit 40. As shown in FIG. 7 for example the pressure sensor 6 which is in the form of a separate component and which is preferably in the form of a pressure switch can have a display unit 40. The display unit 40 is fixed to the pressure sensor 6. In the illustrated embodiment the display unit 40 is reversibly releasably fixed to the pressure sensor 6 by means of a fixing device.

LIST OF REFERENCES 1, 1a, b, c fire extinguishing system valve
2 housing
3 housing cover
4a closing body
4b valve seat
5 alarm passage
6 pressure sensor
7 seal
8 fluid inlet chamber
9 fluid outlet chamber
10, 10a, b, c data interface
11 fluid line
12 sprinkler nozzle
13 recess
14a, b fluid line
15 fluid port
16 data memory
17 testing valve
18a, 18b manometer
19a, 19b valves with shut-off tap
20 data processing unit
21 internal measuring devices
22 alarm means
23 display means
40 display unit
41 display
43 input device
44 LED units
45 fixing device
50 evaluation unit
70 temperature sensors
80 alarm valve station
100 fire extinguishing system

The invention claimed is:

1. An alarm valve station of a fire extinguishing system, comprising:
a fire extinguishing system valve that feeds a plurality of sprinkler nozzles, comprising a housing which has a fluid inlet chamber, a fluid outlet chamber and a closing body reciprocable between a blocking state and a release state, wherein the fluid inlet chamber and the fluid outlet chamber are separated from each other in the blocking state and communicate with each other in fluid-conducting relationship in the release state to flow a fire extinguishing fluid from the fluid inlet chamber to the fluid outlet chamber,
an alarm passage in fluid communication with at least one of the fluid inlet and fluid outlet of the housing, and
an electronic evaluation unit which is integrated in the housing, arranged externally on the housing or arranged in the proximity of the fire extinguishing system valve,
wherein the evaluation unit
is connected in signal-conducting relationship to one or more actuators associated with at least one of the closing body and the alarm passage, and
is adapted to control the actuator or actuators by the control commands, wherein
the alarm valve station has one or more sensors that monitor at least one of the fluid inlet chamber, the fluid outlet chamber, the closing body, and the alarm passage, and the evaluation unit is connected in signal-conducting relationship to the sensor or sensors and is adapted to control the actuator or actuators in dependence on the sensor data present thereat.

2. An alarm valve station according to claim 1, wherein the evaluation unit has a data interface for receiving control commands of the data interface and is adapted to control the actuator or actuators by the control commands which are received and subjected to further processing.

3. An alarm valve station according to claim 1, wherein the one or more actuators comprise an actuator of the closing body that is a control drive of the closing body and the electronic evaluation unit is adapted to move the closing body selectively into the release or into the blocking position by means of the control drive.

4. An alarm valve station according to claim 1, wherein the one or more actuators comprise an actuator of the closing body in the form of a pilot control drive and the electronic evaluation unit is adapted to either lock or unlock the closing body by the pilot control drive.

5. An alarm valve station according to claim 1, wherein the alarm valve station has a testing valve for flooding the alarm passage, wherein the one or more actuators comprise an actuator of the testing valve that is a control drive of the testing valve and the electronic evaluation unit is adapted to move the testing valve selectively into the release or into the blocking position by the control drive.

6. An alarm valve station according to claim 1,
wherein the evaluation unit is connected in signal-conducting relationship to the one or more sensors for receiving data for data processing into at least one of:
state information, or
operating instructions
and is adapted to transmit the state information and/or operating instructions to a display unit.

7. An alarm valve station according to claim 1, comprising a display unit adapted to receive the state information and/or operating instructions from the evaluation unit and to display same.

8. An alarm valve station according to claim 7, wherein the display unit is integrated in the housing.

9. An alarm valve station according to claim 7, wherein the display unit is arranged externally on the housing or in the proximity of the alarm valve station.

10. An alarm valve station according to claim 7, wherein the display unit is adapted to reproduce numerical values and/or text characters, wherein the display unit includes an LCD or LED display.

11. An alarm valve station according to claim 7, wherein the display unit is in the form of a portable communication device.

12. An alarm valve station according to claim 7, wherein the evaluation unit and/or display unit includes an input device for the input of control commands.

13. An alarm valve station according to claim 12, wherein the input device has pressure-sensitive input elements.

14. An alarm valve station according to claim 7, wherein arranged on the housing of the fire extinguishing system valve is a fixing device for reversibly releasably fixing the display unit.

15. An alarm valve station according claim 2, wherein the data interface is adapted for unidirectional or bidirectional, wireless data exchange with a remotely spaced data processing unit.

16. An alarm valve station according to claim 7, wherein the display unit and the evaluation unit are connected in signal-conducting relationship by a data interface.

17. An alarm valve station according to claim 7, wherein the display unit and the evaluation unit are connected in signal-conducting relationship by means of a second dedicated data interface which is in the form of: USB interface, PCI interface, PCI express interface, Thunderbolt interface, or WPAN interface including VFIR-lrDA, IFIR-lrDA, Bluetooth or NFC.

18. An alarm valve station according to claim 17, wherein the display unit and the evaluation unit are adapted to mutually identify each other by the dedicated interface and to automatically form the signal-conducting connection.

19. An alarm valve station according to claim 1, wherein the one or more sensors include one or more pressure sensors integrated in the housing.

20. An alarm valve station according to claim 1, wherein the one or more sensors include one or more temperature sensors adapted to detect the fluid temperature within the fire extinguishing system valve and/or the temperature in one or more further components of the alarm valve station and/or the ambient temperature of the alarm valve station.

21. An alarm valve station according to claim 1, wherein the one or more sensors include one or more internal measuring devices for detecting the water hardness and/or for detecting a flow speed.

22. A fire extinguishing system, comprising:
at least one fluid line, and
an alarm valve station to which one or more fluid lines are connected, wherein
the alarm valve station is designed according to claim 1.

* * * * *